United States Patent [19]
Goossen et al.

[11] Patent Number: 5,786,925
[45] Date of Patent: Jul. 28, 1998

[54] METHOD AND COMPOSITION FOR ARBITRARY ANGLE MIRRORS IN SUBSTRATES FOR USE IN HYBRID OPTICAL SYSTEMS

[75] Inventors: Keith Wayne Goossen, Aberdeen; James Albert Walker, Howell, both of N.J.

[73] Assignee: Lucent Technologies Inc., Murray Hill, N.J.

[21] Appl. No.: 650,582

[22] Filed: May 20, 1996

Related U.S. Application Data

[62] Division of Ser. No. 146,567, Nov. 1, 1993, abandoned.

[51] Int. Cl.$^6$ .......................... G02F 1/025; G02F 1/035; G02F 1/295; G02B 6/26
[52] U.S. Cl. .......................... 359/245; 359/263; 385/2; 385/9; 385/18; 385/49
[58] Field of Search .......................... 430/302, 313, 430/321, 326, 331, 323, 299, 283.1; 216/24, 41, 49; 156/659.1, 662.1, 643.1; 385/2, 8, 9, 18, 14, 49, 131; 359/245, 247, 248, 263

[56] References Cited

U.S. PATENT DOCUMENTS

| | | | |
|---|---|---|---|
| 3,081,168 | 3/1963 | Leekley et al. | 430/283.1 |
| 4,136,928 | 1/1979 | Logan et al. | 385/49 |
| 4,376,160 | 3/1983 | Evanchuk | 430/321 |
| 4,461,535 | 7/1984 | Marcatili | 385/131 |
| 4,564,584 | 1/1986 | Fredericks et al. | 430/323 |
| 4,655,876 | 4/1987 | Kawai et al. | 430/323 |
| 4,732,446 | 3/1988 | Gipson et al. | 385/49 |
| 4,751,171 | 6/1988 | Ogawa | 430/323 |
| 4,869,780 | 9/1989 | Yang et al. | |
| 5,170,448 | 12/1992 | Ackley et al. | 385/14 |
| 5,279,924 | 1/1994 | Sakai et al. | 430/299 |
| 5,366,849 | 11/1994 | Nakagawa et al. | 430/314 |
| 5,480,764 | 1/1996 | Gal et al. | 430/321 |

FOREIGN PATENT DOCUMENTS 0 614 101    9/1994    European Pat. Off.

OTHER PUBLICATIONS

D.R. Purdy, "Fabrication of Complex Micro-Optic Components Using Halftone Transmission Masks to Photosculpt Positive Resist," EOS Top. Mtg. Dig. S., vol. 2, (1993).

Ou et al., "High-Power CW Operation of InGaAs/GaAs Surface-Emitting Lasers with 45° Intraactivity Micro-Mirrors," Appl. Phys. Lett. 59(17), (1991) at 2085–87.

Ou et al., "High Power CW Operation of GaAs/GaAlAs Surface-Emitting Lasers Mounted in the Junction-Up Configuration," Appl. Phys. Lett 59(9), (1991) at 1037–39.

Ou et al., "High Performance Surface-Emitting Lasers with 45° Intracavity Micromirrors," Appl. Phys. Lett. 58(1), (1991) at 16–18.

(List continued on next page.)

*Primary Examiner*—Ricky D. Shafer

[57] ABSTRACT

A method for forming, and an arrangement for using arbitrary angle mirrors in substrates is disclosed. An erodible material, such as a photoresist, is applied to a substrate at a site and is exposed to radiation at that site which has a linear variation in energy at the surface of the erodible material. Due to this variation in exposure energy, a taper results in the erodible material after development. The tapered region is then etched in a manner which etches both the erodible layer and the underlying substrate. The taper in the erodible layer provides a varying attenuation during the etching process such that the taper of the erodible layer, or a multiple of it, is transferred to the substrate. In a first embodiment, a tapered reflective surface is formed in a substrate, which surface engages an optical signal and deflects it to an optical device or another surface. In a second embodiment, two tapered reflective surfaces are formed in a substrate and oriented to deflect incident light to a modulation device. In a third embodiment, an arrangement for modulating a light signal is formed by two tapered reflective surfaces. The surfaces are oriented to form a vee groove in a substrate and are coated with an active semiconductor device.

12 Claims, 3 Drawing Sheets

OTHER PUBLICATIONS

Yang et al., "Surface-Emitting GaAlAs/GaAs Laser With Etched Mirrors," Electronics Letters, (1986) at 438–39.

Hisanga et al., "Fabrication of 3–Dimensionally Shaped Si Diaphragm Dynamic Focusing Mirror," Proc. IEEE Micro. Electro. Mech. Sys., (1993) at 30–35. No Month.

"Feeley 'Micro–Structures'," IEEE Solid–State Sensor Actuator Workshop, (1988) at 13–15. No Month.

Boyd et al., "Multiple Quantum Well Reflection Modulator," Applied Physics Letters, vol. 50, No. 17, (1987) at 1119–1121. No Month.

Abstract of JP Patent No. 01 050 588 (Hiraki Gijutsu Kenkyu Kaihatsu). No date.

METHOD AND COMPOSITION FOR ARBITRARY ANGLE MIRRORS IN SUBSTRATES FOR USE IN HYBRID OPTICAL SYSTEMS

This application is a divisional of application Ser. No. 08/146.567 filed on Nov. 1, 1993, now aband.

FIELD OF THE INVENTION

This invention relates to hybrid electronic/optic systems and more particularly to the formation of angled surfaces in a substrate which alter the path of optical signals.

BACKGROUND OF THE INVENTION

Angled mirrored surfaces are of great utility in optic systems. For example, surface emitting lasers (SELs) with an integrated 45° micromirror can be used to support a variety of applications including neural networks, optical interconnects and optoelectronic integrated circuits. The 45° mirror is used to deflect light from its path in the plane of the laser cavity to an optical path normal to the plane for optical engagement with other devices.

The 45° mirrors of the prior art are typically formed by an ion milling technique. According to this method, a photoresist is applied to a substrate and exposed at the intended site for the mirror. The photoresist is applied so that other features present on the substrate will not be affected by subsequent processing steps. The photoresist is subsequently developed to create an opening at the site. The substrate is then fixed on a tilting table and held at the angle which is to be imparted to the surface which will form the mirror. In the case mentioned above, that angle is 45°. An ion beam of sufficient energy to erode the material is then focussed and directed at the surface such that a deep groove is formed in the substrate. The photoresist, now hardened from previous processing steps, must be stripped off and the surface of the substrate cleaned. To expose the angled surface created by exposure to the ion beam, a wedge of material must be removed from the substrate. To accomplish this, a second groove is formed in the substrate which will intersect with the first groove. However, photoresist must first be reapplied to protect the groove previously formed by the ion beam, exposed and developed to create a second opening at the surface of the substrate. The substrate is then positioned normal to the beam and the second groove is formed. As noted above, the two grooves intersect such that a wedge of material is released from the substrate resulting in an angled surface on the substrate. Thus, the ion milling technique is complicated, requiring separate photolithographic steps for each exposure to the ion beam.

A second technique for forming angled surfaces for various applications is known as crystallographic dependent etching. In this method, the difference in etch rates of the <100> and <111> crystalline planes of silicon is utilized to create an angled surface. In this method, a <100> silicon substrate is coated with a silicon nitride or silicon dioxide film which is subsequently patterned using photolithographic methods and etching to form an etch mask for the bulk silicon. Edges of features in the silicon nitride mask are aligned with the <111> planes intersecting the silicon surface. The exposed silicon <100> surface is then subjected to wet chemical etches which erode <100> orientation silicon at a greater rate than <111> orientation silicon. The etch proceeds into the silicon bulk material, but the <111> silicon planes intersecting the mask edges do not etch significantly. Since the <100> and <111> planes are oriented at 54.74° to each other, this results in a surface oriented 54.74° with respect to the silicon surface. The utility of this method is limited by the fact that the angle between the two surfaces is fixed at exactly 54.74°. Further, application of the silicon nitride or silicon dioxide film adds to the complexity of the overall process. In addition, any angular misalignment between the photoresist mask and the <111> planes causes a translational misalignment in the position of the angular surface.

As noted above, forming mirrors or reflective surfaces by ion milling or crystallographic dependent etching is complicated and, as to the latter method, limited to a single angle.

Accordingly, there is a need for a method to form a reflective surface which is simple and allows the flexibility to readily form surfaces at any desired angle.

SUMMARY OF THE INVENTION

The foregoing problems are solved by the present invention which provides a method for obtaining arbitrary angle reflective surfaces in substrates. According to a first embodiment of the invention, a film of erodible material such as photoresist or photo-definable polyimide is applied to the surface of a substrate. Tile intended taper sites are then exposed to radiation which has an energy variation at the surface of the erodible material. This results in an angular taper in the material at the intended taper sites. The profile of the erodible material is transferred to the underlying substrate by use of an etcher, obtaining a tapered, reflective surface.

In a second embodiment of the invention, two reflective surfaces having taper angles of less than 45° are formed in a substrate. One of the surfaces optically engages an incoming optical signal and deflects it to a modulator/switch. Depending upon the state of the modulator, either the optical signal is reflected to the second of the two surfaces or propagation of the signal ceases.

In a third embodiment, two reflective surfaces are formed in a substrate where the surfaces are coated with an active semiconductor device. Depending upon the state of the active semiconductor device, an optical signal engaging the first reflective surface will either be reflected to the second surface and then to other optical devices such as a detector, or propagation of the signal will cease. A modulator arranged in this manner allows for four passes of the optical signal through the active semiconductor region greatly enhancing the total modulation of the signal.

DETAILED DESCRIPTION

In contrast to the prior art techniques of ion milling and crystallographic dependent etching, reflective surfaces of any angle can be easily formed according to the method described in our copending U.S. application, Ser. No. 08/146,511, which issued as U.S. Pat. No. 5,443,685 on Aug. 22, 1995 entitled "Composition and Method for Off-Axis Growth Sites on Nonpolar Substrates," filed on even date herewith, the specification of which is incorporated herein by reference.

Figure 1:
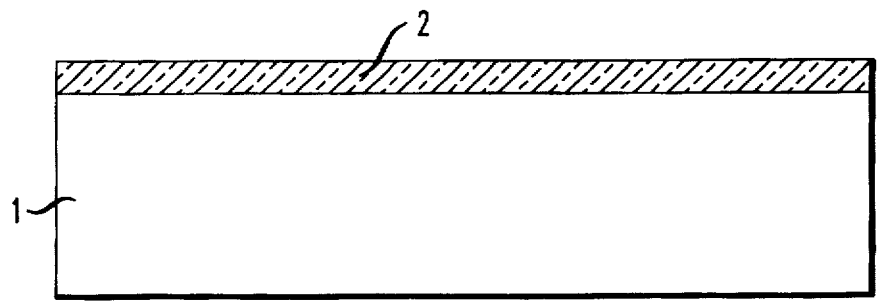
FIG. 1 is an illustration of a substrate which has been coated with an erodible layer.

According to this method, as illustrated in FIG. 1, an erodible material 2 is applied to the surface of a nonpolar substrate 1, such as silicon. Suitable erodible materials include, but are not limited to, photoresists and photo-definable polyimide. The erodible material 2 is characterized by a change in solubility upon exposure to appropriate radiation, typically ultraviolet light, although x-rays or electron beams may be used with certain materials. Exposure may increase or decrease solubility depending upon the nature of the erodible material.

Figure 2:
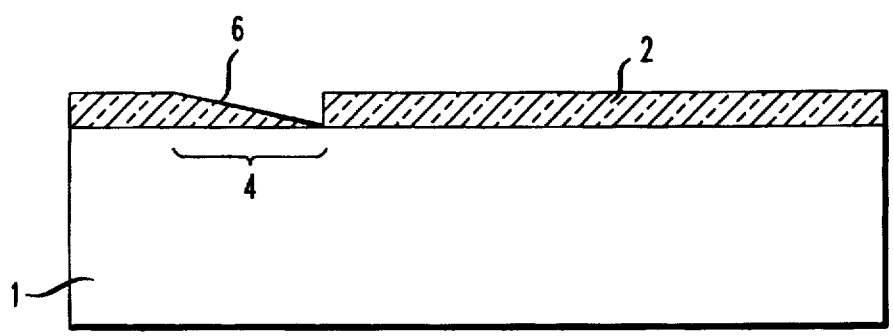
FIG. 2 is an illustration of a taper formed in the erodible layer of FIG. 1 after a site has been exposed to radiation which has a variation in energy at the surface of the erodible material, and subsequently developed.

The erodible material 2 covering the intended taper region or regions 4 is then exposed to radiation. The radiation is applied so that it has an energy variation at the surface of the erodible material. After exposure, the erodible material is then treated with a solvent that removes erodible material of higher solubility. This is referred to as "development." After development, an angular taper 6 in the intended taper region 4 results as illustrated in FIG. 2.

If dielectric films are present on the substrate, which is the case if silicon electronic devices are present, the films must first be removed at the intended taper sites by a method such as etching. Any means for etching through the films is acceptable. Examples include, but are not limited to, reactive ion etching, plasma ion etching, ion milling and wet chemical etching. After the films are removed, erodible material is applied.

To achieve the energy variation discussed above, the halftone, de-focused techniques described by D. R. Purdy, "Fabrication of Complex Micro-Optic Components Using Halftone Transmission Masks to Photosculpt Positive Resist," EOS Top. Mtg. Dig. S., Vol. 2 (1993) and Hisanaga et al., "Fabrication of 3-Dimensionally Shaped Si Diaphragm Dynamic Focusing Mirror," Proc. IEEE Micro. Electro. Mech. Sys. at 30-35 (1993) may suitably be used. These techniques involve developing a photomask with a predetermined variation in gray scale levels. When photoresist is exposed through such a mask, the variation in energy transmission will result in a complementary variation in the depth to which the resist is exposed. Focus is adjusted to introduce a degree of blur so that the digitized nature of the photomask will not be reproduced, resulting in a smooth surface at the photoresist.

Another approach is to use a photomask with linearly graded regions. The linearly graded regions may be formed by a thin film of chromium or iron oxide of appropriately increasing or decreasing particle density. In a presently preferred embodiment, a thin film of inconel is used to create a photomask according to a process developed by Oxford Computer Inc., in Oxford, Conn. Film thickness is varied to achieve a linear variation in the energy incident upon the erodible material, resulting in the tapered profile 6 as shown in FIG. 2 and discussed above.

In a third method for obtaining the tapered profile, which will be referred to as the scanned slit method, a photomask comprising a slit of small width is positioned over the portion of the substrate coated with erodible material. The mask or substrate is held by a motorized micropositioner. As incident radiation is directed at the erodible material, the slit is scanned along the wafer, or vice versa, for the distance desired to form the exposed area. The rate at which the scanning occurs is varied to change the amount of energy incident upon any particular section of the desired area. The amount of erodible material remaining after exposure and subsequent development is directly dependent upon the amount of energy to which it was exposed. Thus, as energy is varied linearly along the desired area, a taper or linear wedge 6 of erodible material will result as illustrated in FIG. 2.

A fourth method for obtaining a tapered profile in the erodible material is known as E-beam lithography, which involves the use of a scanning electron beam. In this method, a suitably programmed E-beam writer is scanned along the width of the intended growth region. A number of scanning passes are made across the width of the region, where, after each pass, the beam is indexed along the length of the intended growth region. Thus, each scan is performed at a slight lengthwise displacement from the previous scan. In this manner, the full area of the intended growth region is sequentially exposed. As the E-beam is indexed along the length of the region, the energy of the beam is varied as required to alter the exposure depth to provide the desired taper.

While the taper in the erodible material can be achieved by any of the aforementioned methods, other suitable means or methods for achieving such tapers may be used and are within the contemplated scope of this invention. It being recognized that other methods may readily occur to those skilled in the art in view of the teachings of the present invention.

Figure 3:
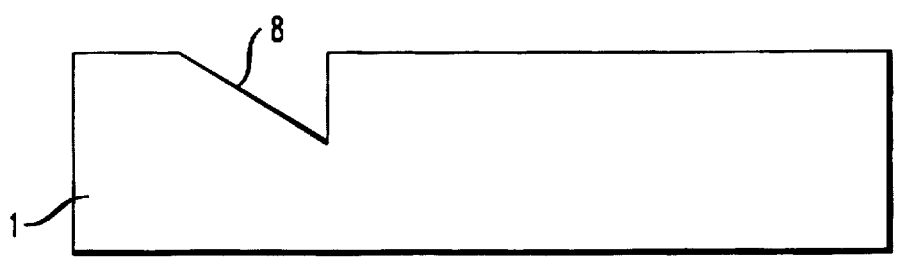
FIG. 3 is an illustration of an angled reflective surface formed in the substrate of FIG. 1 by etching the erodible material and the underlying substrate at the site of the taper.

Having obtained the taper 6 in the erodible layer, as shown in FIG. 2, the wafer is then etched under conditions which etch both the erodible material and the substrate. In typical photolithographic applications, the erodible layer remaining after development protects underlying layers from the etchant, i.e., the erodible layer is not etched. However, in the present invention, the erodible layer is etched as well as the substrate. This etching results in a tapered surface 8 on the substrate, as illustrated in FIG. 3. The erodible material acts as a sacrificial mask which provides a variable attenuation according to its taper in order to transfer the desired shape or angle into the underlying substrate. Reactive ion etching, plasma ion etching, ion milling, wet chemical etching or any other method or means suitable for etching both layers may be used.

There may be applications in which the maximum angle achievable in the erodible material will be much smaller than that desired for the reflective surface. As is well known to those skilled in the art, the relative etch rates of the erodible material and the bulk substrate can be altered. For example, when reactive ion etching is used, the relative etch rates can be changed by changing the oxygen content of the etchant gases. In particular, increasing the oxygen content increases the rate at which the substrate etches relative to the erodible material. Thus, a multiplicative effect is achieved, resulting in a greater angle in the substrate than in the erodible material.

As etched, the tapered surface is suitably reflective. However, a coating or film of a reflective material may be applied to the tapered surface. Suitable reflective materials include, but are not limited to, metallic coatings or dielectric mirrors.

Figure 4:
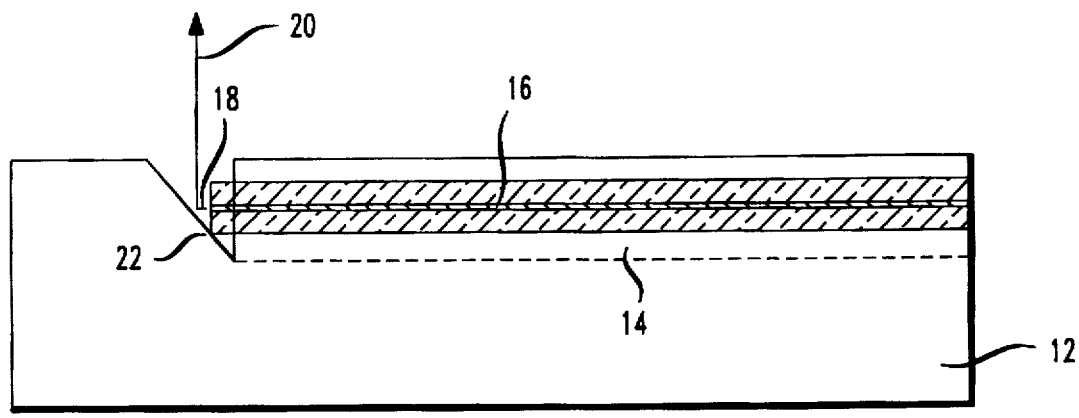
FIG. 4 is an illustration of an embodiment of the invention wherein a tapered reflective surface is formed in a substrate to alter the optical path of signals travelling in waveguides located on the substrate.

In a first embodiment of the invention, illustrated in FIG. 4, a tapered reflective surface 22 optically engages optical signals 18 propagating along one or more waveguides 16 contained in a "vee" groove 14 in a substrate 12. The tapered reflective surface 22 is formed in the substrate 12 such that incoming optical signals 18 are deflected from a first optical path along waveguide 16 to a second optical path 20 upon optical engagement with surface 22. The second optical path 20, which is a function of the angle of tapered reflective surface 22, may then optically engage an optical component or a second reflective surface. In this manner, the optical signal may be directed to a different waveguide or various optical devices. In a preferred embodiment, the angle of the reflective surface is 45°. However, a reflective surface of any angle may be provided as required. The tapered reflective surface 22 may be formed as discussed above.

Figure 5:
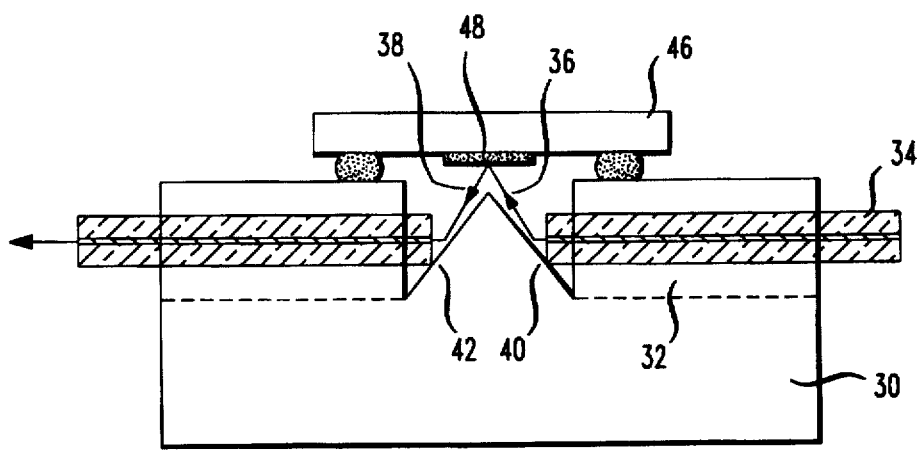
FIG. 5 is an illustration of a second embodiment of the invention wherein two tapered reflective surfaces are formed in a substrate to optically engage a modulation means for controlling the transmission of optical signals along a waveguide.
Figure 6:
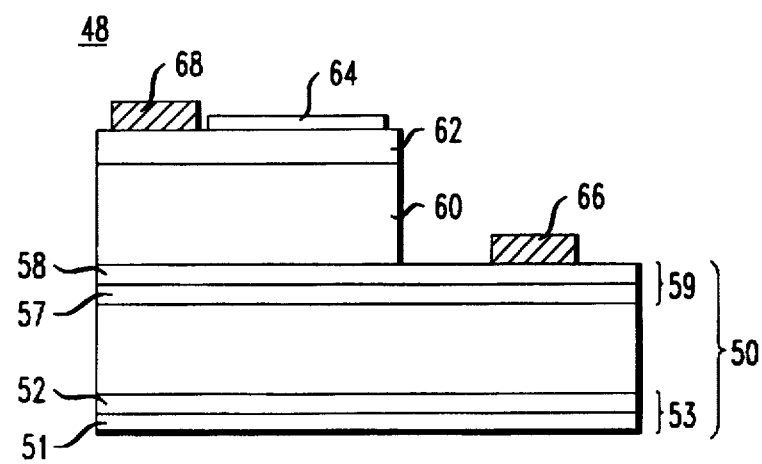
FIG. 6 is an illustration of an active semiconductor device for modulation of light.

In a second embodiment, illustrated in FIG. 5, first and second tapered reflective surface 40,42 are formed in a substrate 30, preferably as discussed above. Optical signals 36, propagating through one or more waveguides 34 located in vee groove 32, optically engage a first reflective surface 40. Upon contact with surface 40, the optical signals 36 are directed to a modulation device 46 including an active semiconductor device 48. Such a device has been reported by Boyd et al., "Multiple Quantum Well Reflection Modulator," APPL. PHYS. LETT. 50(17 at 1119–21 (1987). One suitable active semiconductor device for use as the active semiconductor device 48 is illustrated in FIG. 6. The device 48 is a multi-layer structure consisting of a periodic layer mirror 50, an electroabsorptive semiconductor 60, a transparent semiconductor contact 62 and, optionally, an anti-reflection coating 64.

The periodic layer mirror consists of a number of periods 53,59, each of which is comprised of two layers 51, 52 or 57, 58 of transparent semiconductor material of differing refractive indices. The thickness of each layer, typically one-quarter wavelength of the light in the layer,)and number of periods are chosen to provide high reflectivity at a given operating wavelength via an optical interference effect. Two periods (four layers) are shown in FIG. 6 for clarity. However, a greater number of periods, typically twelve, are normally present.

The mirror 50 is capped by an electroabsorptive semiconductor 60, i.e., a semiconductor in which light absorption at the operating wavelength is affected by an electric field. A transparent semiconductor contact 62 is formed on the electroabsorptive semiconductor 60.

The mirror and contact layers are conductive so as to allow electrical bias to be applied to the electroabsorptive layer. Bias is delivered via electrodes 66 and 68 placed on these layers. The electroabsorptive layer is insulating so that a large electric field is produced across it upon application of bias. The absorptive capacity of the electroabsorptive material is a function of the applied bias, i.e., as bias is applied, light may be either absorbed or reflected dependant upon the design of the device. Thus, the reflectivity of the active semiconductor device is a function of the applied bias.

The mirror and contact layers usually have differing electrical conductivity types, i.e., one is p-type and the other n-type, so as to form a diode. Thus, bias may be applied by reverse biasing the resulting diode which produces a field without current flow. This reduces the load of the device on the bias supply.

As mentioned above, the device may optionally include an anti-reflection coating 64, which is applied to the transparent semiconductor contact layer 62.

Propagation of optical signals 38 to the second reflective surface 42 is thus dependent upon the state of the modulation device 46. In a first non-absorptive state, the optical path from the first 40 to the second 42 reflective surface is enabled, allowing propagation of the signal. In a second absorptive state, optical signals 36 will not propagate beyond the modulation device 46 since they are absorbed by the active semiconductor device 48. Thus, this arrangement may function as a switch.

It should be understood that in the reflective state not all light is reflected, i.e., there is some signal loss. Likewise, in the absorptive state, not all light is absorbed. The contrast ratio, i.e., the ratio of the light reflected in state 1 to light reflected in state 2, is an important performance parameter which will be discussed below in conjunction with a third embodiment of the invention.

Figure 7:
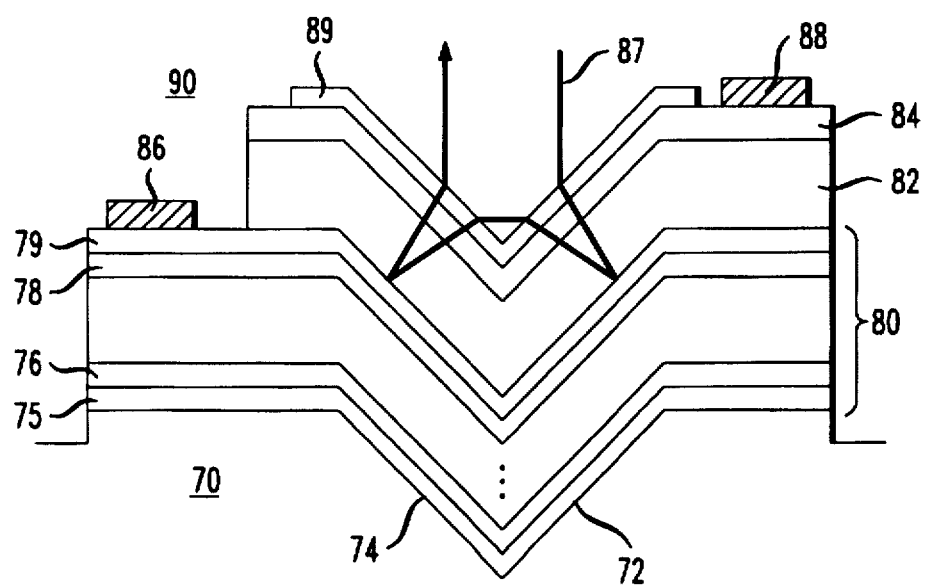
FIG. 7 is an illustration of a third embodiment of the invention wherein a light modulator is formed by coating two tapered reflective surfaces with an active semiconductor device.

In a third embodiment of the invention, illustrated in FIG. 7, a light modulator may be formed using two angled reflective surfaces 72, 74 which are coated with an active semiconductor device 90. The angled surfaces 72 and 74 are formed in a substrate 70 such that the reflective surfaces face each other creating a vee-groove. The surfaces are preferably formed as taught by the present invention. An active semiconductor device 90 is formed on the angled surfaces 72 and 74. The structure of the active semiconductor device 90 is similar to that described above for device 48 of FIG. 6, consisting of a periodic layer mirror 80, an electroabsorptive semiconductor 82, a transparent semiconductor contact 84, electrodes 86 and 88, and an optional anti-reflection coating 89. The periodic layer mirror 80 is comprised of a number of layers of transparent semiconductor material 75, 76, 78, 79 as previously described. While four layers (two periods) are shown for clarity, additional layers are normally present.

Optical signal 87 engages the active semiconductor device 90. When the device is formed on angled surfaces 72 and 74 as shown, the optical signal 87 makes four passes through electroabsorptive semiconductor 82, rather than two as in the second embodiment and in the prior art. The additional passes result in improved contrast. In addition, the angled surfaces result in a displacement of the reflected beam compared to the incident beam. This eliminates the need for the beamsplitters commonly employed in the prior art to achieve the same result, thus achieving a significant simplification of the optics. Compare Boyd et al., supra, at FIG. 1.

We claim:

1. An arrangement for modulating an optical signal, comprising:
   first and a second tapered surfaces formed in a substrate; and
   an active semiconductor device operable to substantially absorb the optical signal in a first state and substantially reflect the optical signal in a second state, wherein,
   the active semiconductor device receives the optical signal when said optical signal is directed towards the first tapered surface, and, wherein,
   the first tapered surface and the active semiconductor device are spatially oriented relative to the second tapered surface so that a portion of the optical signal received by the active semiconductor device is reflected towards the second tapered surface, and, wherein, the reflected portion of the optical signal is substantially less when the active semiconductor device is in the first state than when the active semiconductor device is in the second state.

2. The arrangement of claim 1 wherein the active semiconductor device comprises a periodic layer mirror, an electroabsorptive semiconductor, a transparent semiconductor contact and a bias supply.

3. The arrangement of claim 1 wherein the optical signal is transmitted by a waveguide located in a vee groove formed in the substrate.

4. The arrangement of claim 3 wherein the waveguide is an optical fiber.

5. The arrangement of claim 3 wherein the active semiconductor device is out of plane relative to the waveguide and the first tapered surface reflects the optical signal out of plane to the active semiconductor device and the second tapered surface reflects the optical signal back in plane.

6. The arrangement of claim 1 wherein the substrate is silicon.

7. The arrangement of claim 1 wherein the first and second tapered surfaces are oriented with respect to each other to form a vee groove.

8. The arrangement of claim 7 wherein the active semiconductor device is located on the first and second tapered surfaces.

9. An apparatus for modulating an optical signal comprising:
   a first tapered reflective surface formed in a substrate for receiving and reflecting the optical signal;
   a modulator that receives the reflected optical signal and reflects a lesser portion of the optical signal in a first state and a greater portion of the optical signal in a second state; and
   a second tapered reflective surface formed in the substrate that receives the lesser and greater portions of the optical signal reflected from the modulator during its respective first and second states.

10. The apparatus of claim 9 wherein the modulation device comprises a periodic layer mirror, an electroabsorptive semiconductor, a transparent semiconductor contact and a bias supply.

11. The apparatus of claim 9 further comprising:
   a vee groove formed in the substrate; and
   a waveguide located within the vee groove; wherein, the optical signal received by the first tapered reflective surface is delivered by the waveguide.

12. The apparatus of claim 9 and further wherein the first tapered surface is characterized by an angle of less than 45 degrees relative to the optical signal.

* * * * *